Nov. 1, 1960   M. GOURNELLE   2,958,367
MACHINE FOR WELDING PLASTICS
Filed March 8. 1956   2 Sheets-Sheet 1
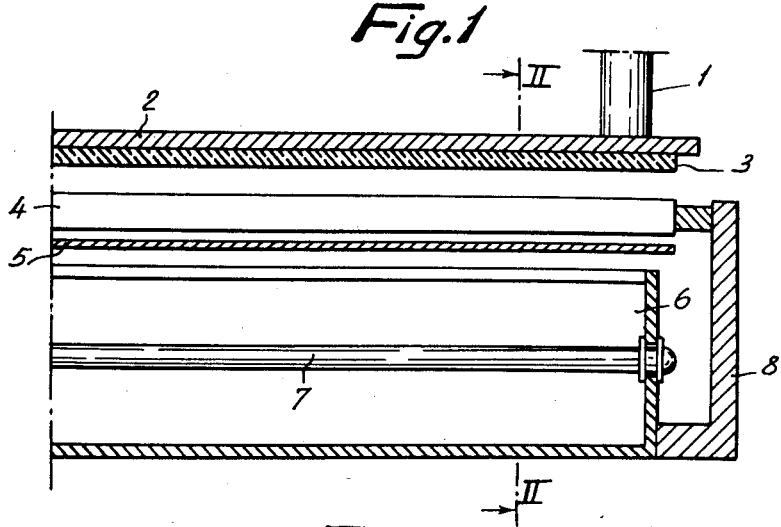
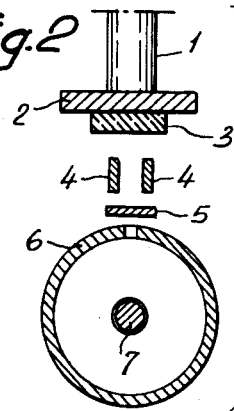
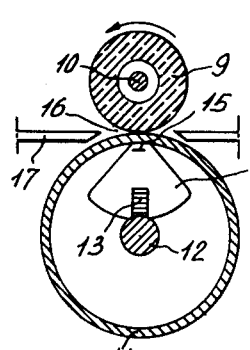
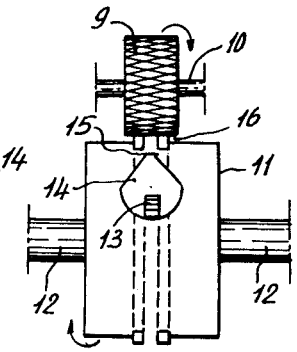
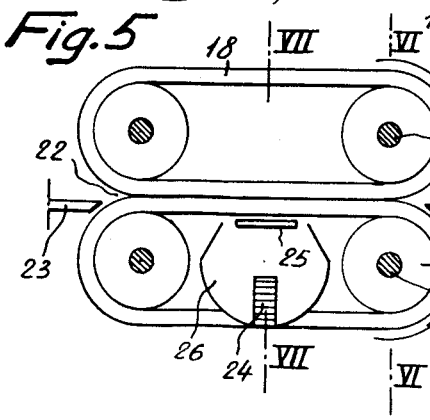
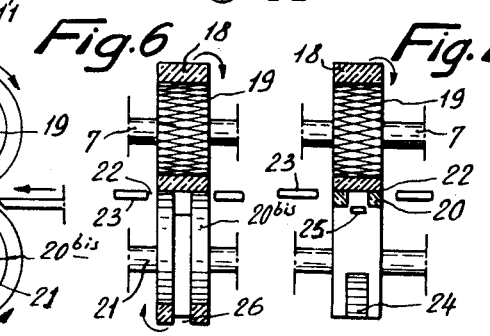
INVENTOR
MAURICE GOURNELLE
BY Young, Emery & Thompson
ATTORNEYS Nov. 1, 1960   M. GOURNELLE   2,958,367
MACHINE FOR WELDING PLASTICS
Filed March 8, 1956
2 Sheets-Sheet 2

INVENTOR
MAURICE GOURNELLE
BY Young, Emery & Thompson
ATTORNEYS

United States Patent Office 2,958,367
Patented Nov. 1, 1960

2,958,367

MACHINE FOR WELDING PLASTICS

Maurice Gournelle, 1 Rue des Bruyeres a Asnieres, Asnieres, Seine, France

Filed Mar. 8, 1956, Ser. No. 570,234

Claims priority, application France Mar. 11, 1955

1 Claim. (Cl. 154—42)

This invention relates to a machine for welding plastics which are weldable by heat, such as, in particular, polyethylene or polythene.

A certain number of known methods of making weld bands on films or other articles of plastic material consist in particular in heating an apparatus which exerts a determined pressure on the materials to be welded, to which heat is transmitted directly by conduction at the weld point or by thermal impulses resulting from current pulses so as to effect the melting of the plastic material by an electric current of short duration, the plastic foils being removed only when the whole has cooled sufficiently.

Now the constituent elements of this kind of equipment which is intended for carrying out these methods undergo deterioration owing to wear and in consequence of the continual temperature changes; nor do these apparatuses in any way prevent adhesion, which is a major drawback, because the material heated to softening point or melting point adheres to the heat transmitting means. Attempts have been made to obviate this disadvantage by disposing, between the material to be welded and the heating means, a non-adhesive substance such as, for example, a foil of cellophane, or a polytetrafluoroethylene.

These advantages can be dependably obviated according to the invention.

It should however further be noted that in order to obtain a regular and homogeneous weld band it is necessary to exert a certain pressure, because the plastic material, and particularly polyethylene has a thermal expansion which must be taken into account during the welding process as must its shrinkage during cooling, since the excess of material due to expansion and contraction tends to form undulations on the weld.

The object of the present invention is to obviate these disadvantages by utilizing a machine for welding plastic materials which are weldable by heat, said machine using an appropriate source of radiant heat, the radiation of which is directed intermittently or continuously when the material is moved for example, onto the welded part, which is held on an appropriate support such as, for example, a support having absorbing properties by means of a tensioning device which also serves as a clamping means.

The source of radiant heat is a wire or strip raised to a red heat by an electric current or at least an emitter of infra-red rays.

The carrying out of the present invention has, in particular, at least one of the following features:

(a) The radiation is directed by approach.

(b) Welding is effected in the focal plane in the case mainly of an optical apparatus, and the infra-red source or the product to be welded is moved in the focal plane according to the desired properties of the weld.

(c) A movable screen controlled by any appropriate means effects successively the release and then the interruption of the radiation.

(d) An impulse system effects the releasing and the interrupting of the radiation.

(e) A film of polytetrafluorethylene, for example stratified, is interposed, without direct contact with the infra-red generating means and the film to be welded.

This insertion of a material which permits the passage of, or which transmits, the infra-red rays enables the appearance of the weld to be ornamented and, in particular, enables any traces of liquid or pulverulent substances to be removed from the site of the weld by means of a slight pressure.

(f) Infra-red rays of a certain wavelength generally lower than $4\mu$ are concentrated and directed onto a bar of quartz or fluorite or sylvite for example, on which welding is carried out directly.

The machine forming the subject of the invention enables the weld to be heated principally through the interior, practically like high-frequency welding. The energy emitted by a source infra-red radiation is a directed energy which is converted directly and totally into heat in the actual mass of the material to be treated.

Some basic diagrams showing embodiments of the machine for welding polyethylene by infra-red radiation are illustrated in the accompanying drawing, which is given solely by way of example and in which:

Figure 1 is a diagram of a radiation welding machine.

Figure 2 is a vertical cross-section on the line II—II in Figure 1.

Figures 3 and 4 illustrate diagrammatically a roller machine for continuous welding.

Figures 5 to 7 illustrate a modification of a continuous welding machine.

Figure 13 shows the insertion of a band of polytetrafluorethylene.

Figure 8:
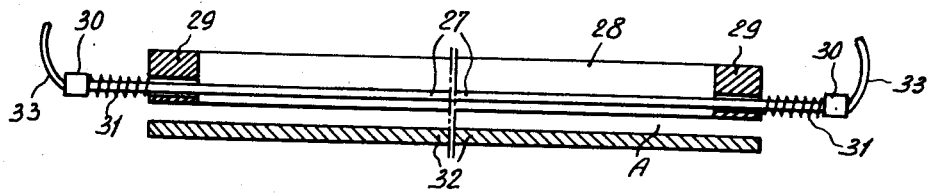
Figures 8 and 9 show the principle of a welding bar controlled by impulses.

Referring to Figures 1 and 2, 1 indicates the support which receives the lowering or pushing means on the rigid frame or plate 2. A plug or plate 3 having infra-red absorbing power and preferably of rubber is provided to obtain the maximum efficiency and to prevent sliding of the material to be welded owing to the expansion and contraction during the welding operation.

The product to be welded is provided with the tensioning means 4 constituted by two parallel bars between which the infra-red rays pass and one of which may be constructed so as to be able to cut the plastic material at the same time as welding is effected, or by an independent cutting means which is guided on the tensioning and pressure bars.

A reflector 6, which is provided with a slot of variable width and which is appropriately ventilated or thermally insulated according to circumstances, is disposed beneath a shutter screen 5. Said shutter screen is controlled either mechanically or by a mechanical, electromechanical or electronic variable time constant.

Finally, the emitter 7 or source of infra-red rays is disposed on a rigid support 8.

It is of course possible to weld with two sources of infra-red rays one above the other or one opposite the other. The rays may cross or join.

The plate or support may be given signs, inscriptions, figures or masks, raised or sunken, which are superimposed in the polyethylene at the moment of welding.

Such a device is usuable both in machines called "hand pliers" and in automatic devices.

In a machine for continuous welding by means of rollers (Figures 3 and 4), a rubber roller constituting the absorbing body or black body 9, and cast on a spindle 10, is driven by a wheel 11 mounted on a spindle 12, while a candle or source 13 of infra-red rays applies the radiation by means of a reflector 14 and through an interrupting shutter 15. The material to be welded is introduced at 16 on the work table 17.

A photoelectric cell correctly disposed on the weld can control the quality of the latter and regulate operation in respect of the speed of the machine and in respect of the temperature and starting and stopping. The machine is moved by one or a plurality of motors equipped with speed and pressure varying devices and heating or cooling regulators.

Either the roller or the wheel, or both, are drivers.

In order to obtain a certain pressure on the weld, use may be made of a cushion or jet of compressed air which also cools the weld if it is appropriately disposed.

According to another embodiment of a machine for continuous welding (Figures 5 to 7), a flat belt forming a black body 18 is driven on pulleys 19 in connection with two parallel spaced pulleys 20 of appropriate material, which are mounted on a spindle 21, and the material to be welded is introduced at 22 on a work table 23. The radiation is produced by an infra-red candle 24 through an interrupting screen 25 and by a reflector 26. This is a high-speed machine.

Figure 9:
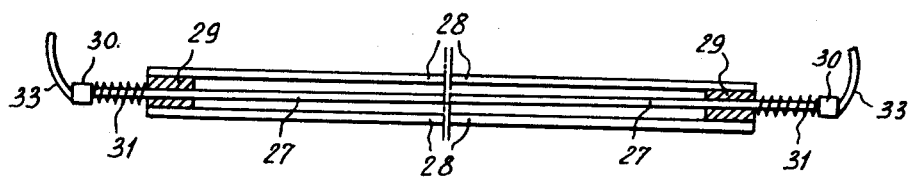

Figures 8 and 9 show a type of economical machine having a welding bar controlled, for example, by impulses and capable of being mounted on machines or serving to modify existing machines.

A resistance wire 27 is raised, at determined moments, to a certain temperature, but is placed at a certain distance from the material to be welded to prevent the latter from being in contact with the source of heat.

Bars 28 serve to hold the wire 27 and to exert a pressure on the material placed in the space A. Insulators 29, contact stops 30, and springs 31 absorb the expansion of the wire 27 and complete the assembly. 32 is the rubber support and 33 the connections to the source of current.

Figure 10:
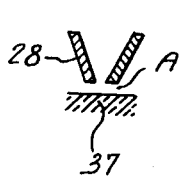
Figures 10, 11, 12 and 13 are details relating to Figures 8 and 9.
Figure 11:
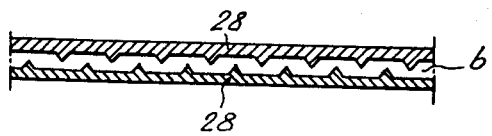

The bars 28 may however be inclined in any direction (Figure 10) or have any appropriate section (Figure 11).

Figure 12:
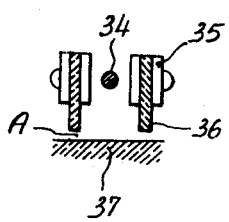
Figure 13:
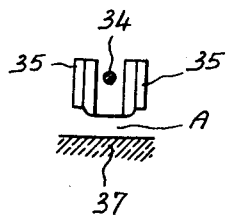

In another embodiment (Figure 12), a source of infra-red 34 is provided between the bars 35 containing a rubber foil 36, and the space reserved for the plastic, above the black body 37, is at A or else use may be made of a foil of polytetrafluorethylene held on two sides and stretched between the bars 35 (Figure 13).

Said black body may be covered with a hydrophobic product, or one having completely or in part the properties of the black body, for example polytetrafluorethylene, or else polychlorofluorethylene.

Figure 14:
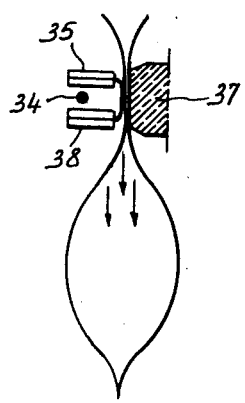
Figure 14 shows a polythene bag to be closed.

Finally, in Figure 14, a band of stratified polytetrafluorethylene is provided, being stretched at 38 between the bars 35, for the purpose of enabling the assembly, at the moment of welding, to drive out, by pressure, packaged products remaining at the site of the weld.

The tension-pressure bars, the parallel rollers and the parallel belts serve practically exclusively to counteract the thermal expansion and the contraction of the welds and also to effect the driving of the material.

Thermostats may in particular regulate the temperature of or control the source of infra-red rays.

Foils or sheets may be welded end to end, or thermoplastic sections capable of being welded under heat.

The weld obtained by the utilization of the machine of the invention has numerous advantages, and particularly the following:

The heating is not limited in respect of power and in a continuous welding machine the speed is limited only by the mechanical characteristics.

It is obvious that the selection of the temperature required for welding the material can be determined absolutely.

The weld is perfectly transparent and in no way alters the intrinsic qualities of the polythene and it is not necessary to wait until cooling is completed.

It practically completely retains the thickness to be welded. It is neither rolled nor welded under pressure and consequently there is no incipient cut and its resistance is increased. It is tight to gas and to liquids and the width of the weld is variable. Finally, it may have any desired appearance, for example bear a trademark.

The sources of heat may have an elevated temperature and the transmission of said heat is effected by radiation more than by convection. It follows that if the object treated has, in the infra-red, a low reflecting power together with an absorbing power, the energy of said radiation passes through the surface without stopping there and it is only inside that it is progressively transformed into heat.

The distribution of the temperature being much more uniform, the radiation must be sufficiently penetrating not to be stopped in the immediate vicinity of the surface.

In the case of the welds upon plastics, in view of the small thicknesses, the technique does not require preciseness as in the case of very large thicknesses (several centimetres). It is in the neighbourhood of 1.5 m$\mu$ that best results are generally obtained.

The invention enables the heat energy to be supplied directly to the point at which it must be used.

The invention is not limited to those of its various embodiments which have been described hereinabove and which are shown in the drawing, but covers all modifications based on the same inventive idea, particularly:

That in which the thermal insulation of the supports, of the work table, of the tension and pressure bars is obtained by a cushion or circulation of air;

That in which the source of heat is periodically basked for example;

That in which, in the case of Figures 1 and 2, the plate 2 or the generator is movable, one or the other or both approaching one another;

That in which the bars approach the plate 2, clamping the polyethylene, the source of infra-red rays in turn approaches the bars, effects the weld and then withdraws. The bars in turn withdraw and the weld is made. The source of infra-red rays is sufficiently far away from the system not to produce the weld when at rest and when heated, but for its approach to cause the plastic material to melt. The distance of the source of infra-red rays or its intensity, or both, are variable in the case, for example, of different thicknesses to be welded;

That in which the machines are obviously adjustable for the welding of coloured plastics;

That in which the use of the machine or machines in the particular case of packaging, in which the two tension and pressure bars may be side by side without clearance, for the purpose of exerting a certain pressure on the bag if, for example, the latter contains pasty or syrupy substances to be packed and the nature of which prevents the passage of the infra-red rays or prevents the transmission thereof to the second wall of the bag in question:

(1) Said two bars are side by side without a space between them, the products are driven out on either side of the assembly with the aid of a certain pressure on the plate;

(2) When this operation has been carried out, the bars move apart or open for the passage of the infra-red rays, freeing a space of polyethylene which is freed to the maximum of impurities, on which the weld made thus offers a guaranteed maximum solidity and tightness.

The invention covers new industrial products constituted by machines incorporating the application of said invention and by the products welded by means of said machines.

What I claim is:

Apparatus for welding by radiation plastic thermofusible materials, comprising in combination a support having at least one layer of material that absorbs infra red rays and on which the materials to be welded are placed, an emitter of infra red rays of wave length below $4\mu$ positioned opposite said support, a reflector associated with the emitter capable of concentrating said infra red rays and of directing them toward and through the zone of said plastic material in which the weld is to be made, said reflector having a slot through which the radiation is projected, a shutter adapted to be moved across said slot, tension bars mounted on opposite sides of the emitter to contact the material to be welded and press it against the support outside of the weld zone, and capable of exerting a pressure sufficient to prevent elasto-plastic shrinkage of said materials, and means for thermally insulating the support and said tension bars.

References Cited in the file of this patent

UNITED STATES PATENTS

| Number | Name | Date |
|---|---|---|
| 1,245,006 | Mentzer | Oct. 30, 1917 |
| 1,591,754 | Gates | July 6, 1926 |
| 1,822,076 | Bauersfeld et al. | Sept. 8, 1931 |
| 2,173,325 | Alexander | Sept. 19, 1939 |
| 2,280,402 | Greppin | Apr. 21, 1942 |
| 2,358,455 | Hallman | Sept. 19, 1944 |
| 2,364,729 | Leroux | Dec. 12, 1944 |
| 2,431,520 | Streich | Nov. 25, 1947 |
| 2,494,058 | Ries et al. | Jan. 10, 1950 |
| 2,622,053 | Clowe | Dec. 16, 1952 |
| 2,625,201 | Smith | Jan. 13, 1953 |
| 2,632,921 | Kreidl | Mar. 31, 1953 |
| 2,665,738 | Caskin | Jan. 12, 1954 |
| 2,682,910 | Piazze | July 6, 1954 |
| 2,697,773 | Gordon | Dec. 21, 1954 |
| 2,705,523 | Hasselquist | Apr. 5, 1955 |
| 2,737,999 | Schjeldahl | Mar. 13, 1956 |
| 2,760,049 | Harper | Aug. 21, 1956 |
| 2,796,913 | Fener et al. | June 25, 1957 |
| 2,798,943 | Prideaux | July 9, 1957 |
| 2,804,120 | Dancewicz | Aug. 27, 1957 |
| 2,827,554 | Gunther et al. | Mar. 18, 1958 |